United States Patent [19]

Marantette et al.

[11] 3,929,393
[45] Dec. 30, 1975

[54] WATER-RUBBER BEARING HIGH SPEED DRILL SPINDLE

[76] Inventors: William F. Marantette; Ruth B. Marantette, both of 20624 Earl St., Torrance, Calif. 90503

[22] Filed: Feb. 14, 1975

[21] Appl. No.: 549,860

[52] U.S. Cl. .................................. 308/76; 308/122
[51] Int. Cl.² .... F16C 1/24; F16C 3/14; F16C 3/16; F16C 33/66
[58] Field of Search ............ 308/76, 36.1, 170, 169, 308/122; 184/104

[56] References Cited
UNITED STATES PATENTS

| | | | |
|---|---|---|---|
| 1,959,451 | 5/1934 | Vogel-Jorgensen | 308/76 |
| 2,809,078 | 10/1957 | Hartwig | 308/76 |
| 2,854,296 | 9/1958 | Eberle et al. | 308/76 |
| 3,104,921 | 9/1963 | Newcomer | 308/122 |
| 3,476,451 | 11/1969 | Schwartzman | 308/122 |
| 3,674,355 | 4/1972 | Yearout et al. | 308/122 |

*Primary Examiner*—Lloyd L. King
*Attorney, Agent, or Firm*—Ralph B. Pastoriza

[57] ABSTRACT

A high speed drill spindle shaft is supported by lower and upper conically shaped rubber bushings matching corresponding tapered end portions on the shaft, the lower and upper tapers being in opposite directions. A spring urges the rubber bearings in the axial direction of increasing taper so that there is maintained a substantially zero clearance with the tapered end portions of the shaft. Water is introduced to the tapered engaging areas of the rubber bearings and the shaft tapered surfaces to essentially "float" the shaft, any changes in the dimensions of the rubber bearings being accommodated by axial movement of the bearings relative to the shaft to maintain the desired substantially zero clearance and yet prevent binding or excessive contact pressure.

9 Claims, 5 Drawing Figures

WATER-RUBBER BEARING HIGH SPEED DRILL SPINDLE

This invention relates generally to shaft bearings and more particularly to an improved water-rubber bearing high speed drill spindle assembly.

BACKGROUND OF THE INVENTION

Conventional ball and roller type bearings as well as all oil lubricated bearings are not feasible for use with shafts rotating at extremely high speeds. For example, if the rotational speed of a shaft is in the range of 50,000 to 100,000 RPM, ball and roller type bearings will rapidly deteriorate and oil lubricated bearings become overheated resulting in similar deterioration.

Thus, for the case of very high speed rotating shafts such as drill spindles used in particular operations, there have been developed air-bearing spindles capable of operating in the above-noted speed range. However, these air-bearing supports are expensive to manufacture and require substantial energy in producing the necesssary compressed air. As an alternative, there have been proposed the use of metal-on-rubber bearings with water lubrication but the application of this type of bearing to extremely high rotational speeds has not been feasible because of dimensional changes resulting chiefly from water absorption by the rubber.

BRIEF DESCRIPTION OF THE PRESENT INVENTION

With the foregoing in mind, the present invention contemplates a new high speed bearing utilizing the principles of metal-on-rubber with water lubrication but wherein a wholly feasible and relatively inexpensive bearing support is provided. Essentially, the resulting advantages over conventional ball bearing systems or oil lubricated systems include, first enormously higher rotational speeds can be tolerated which speeds would normally cause ball bearings to destruct or friction bearings to overheat; second, relatively low friction is provided at these high rotational speeds; third, substantially zero clearance and consequently zero radial and axial excursion from the optimum is realizable for the rotating shaft; fourth, in utilizing the rubber, the vibration-damping characteristics can be taken advantage of; and fifth, the overall arrangement is such that there is a diminished rate of wear in the bearings.

Briefly, the invention includes a shaft having oppositely tapered concically shaped end portions cooperating with first and second bearing blocks including matching tapered conically shaped rubber bushings surrounding and supporting the tapered, conically shaped end portions of the shaft. A biasing means is provided urging the bearing blocks in the directions of increasing taper relative to the shaft to leave substantially zero clearance between the engaging tapered surfaces of the rubber bushings and tapered shaft portions. Water passage means are provided in the bearing blocks for introducing water to the contact area of the bushings and shaft whereby the shaft is "floated" on the water in the pores of the rubber bushings, any change in the size of the bushings such as swelling being accommodated by relative axial movement of the bushings and supporting blocks so that the desired zero clearance is substantially maintained and yet excessive bearing contact force is prevented.

There is thus provided a self-compensating arrangement so that it becomes feasible to utilize a water bearing rubber bushing combination.

BRIEF DESCRIPTION OF THE DRAWINGS

A better understanding of this invention will be had by referring to the accompanying drawings in which.

DETAILED DESCRIPTION OF THE INVENTION

Figure 1:
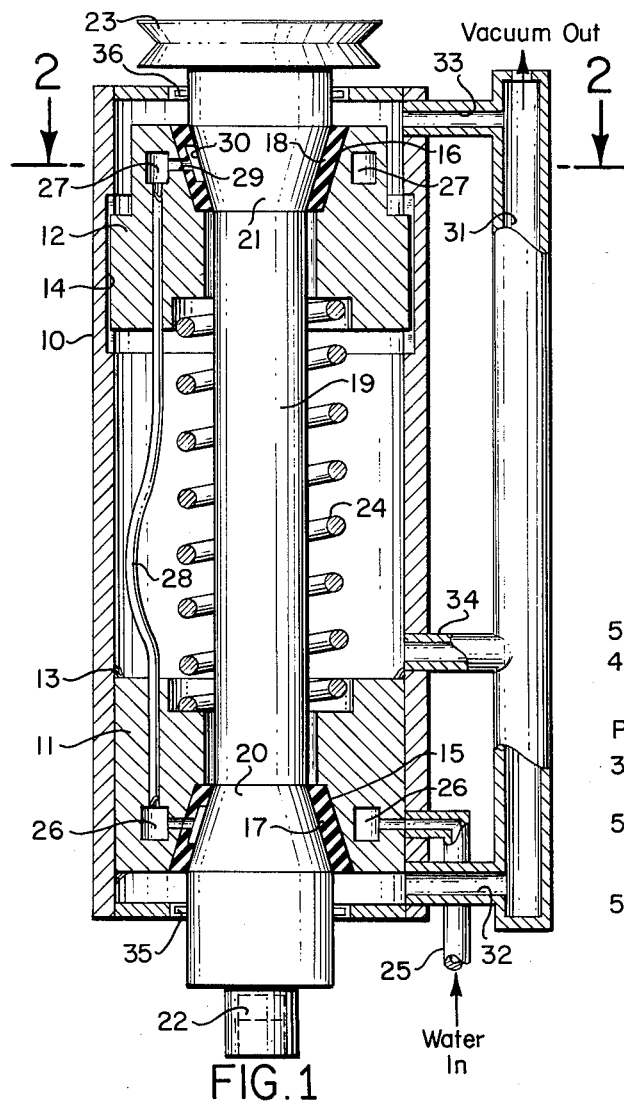
FIG. 1 is a cut-away view partly in cross section of a first embodiment of the high speed water-rubber bearing of this invention.

Referring first to FIG. 1, there is shown an outer cylindrical barrel 10 incorporating lower and upper bearing blocks 11 and 12. In the embodiment of FIG. 1, the lower bearing block 11 is fixed to the inside wall of the barrel 10 as at 13. The upper bearing block 12 however is axially movable over a short distance there being provided a key way 14 in the barrel 10 for this purpose.

The lower and upper bearing blocks 11 and 12 respectively define annular tapered bearing surfaces 15 and 16 to which are secured lower and upper rubber bearing bushings 17 and 18. These bushings are of conical shape to match the tapered surfaces 15 and 16 as shown, the taper of the surfaces and rubber bushings at the opposite ends being in opposite directions.

A central shaft 19 passes through the rubber bushings as shown and includes lower and upper end portions tapered as at 20 and 21 in opposite directions to match the taper of the bushings. In the embodiment of FIG. 1, the lower end taper 20 of the shaft 19 is defined by an increasing diameter in a downward direction and the upper end taper 21 by an increasing diameter in an upward direction. The extreme lower end of the shaft 19 includes a collet 22 for holding a drill while the upper end may terminate in a drive pulley 23 for connection to any suitable drive motor (not shown).

In accord with an important feature of this invention, there is provided a biasing means in the form of a coiled compression spring 24 surrounding the shaft 19 and having its opposite ends exerting downward and upward forces respectively on the lower and upper bearing blocks 11 and 12 tending to bias them apart. While the lower bearing block 11 is fixed to the barrel 10, it will be appreciated that the upward force exerted by the compression spring 24 against the upper bearing block 12 will be transmitted to the shaft 19 itself tending to urge the shaft upwardly so that the lower bearing block rubber bushing 17 will be urged into close engagement with the lower tapered surface 20 of the shaft. Essentially, the biasing means assures that there is substantially zero clearance between the bearing surfaces of the rubber bushings and the tapered end portions of the shaft.

The assembly of FIG. 1 is completed by the provision of water passage means for introducing water between the engaging conical surfaces of the rubber bushings and tapered end portions of the shafts. This passage means includes a water inlet passage shown in the lower right hand portion of FIG. 1 at 25 connected to an annular manifold 26 incorporated in the lower bearing block 11. The upper bearing block 12 similarly includes an annular water manifold 27 communicating with the manifold 26 by means of a flexible tube 28 running within the barrel 10. It will be noted that slack is provided in the flexible tube 28 so that slight axial relative motions between the lower and upper bearing blocks will be accommodated without tensioning the flexible tube.

The annular manifolds 26 and 27 and associated passages within the bearing blocks for providing water to the bearings are the same and thus a detailed description of one will suffice for both. With specific reference to the upper bearing block 12, it will be noted that water passage means within the bearing block include radially inwardly extending metering jets one of which is shown at 29 in FIG. 1, passing into the rubber bushing 18 to terminate in pockets such as the pocket 30 for the jet passage 29, these pockets being at the surface of the surface-to-surface areas of the bushing with the tapered shaft portion.

The assembly of FIG. 1 is completed by the provision of a vacuum outlet passage means including an elongated exterior tube 31 having lower and upper branch passages 32 and 33 communicating with the lower and upper interior portions of the barrel 10 as well as a central passage 34 to draw out and remove water from the interior. In this respect, the drawing of a slight vacuum will cause air to pass around the lower and upper ends of the barrel 10 through loose seals 35 and 36 and thus avoid the possibility of water passing from the lower and upper ends of the barrel at these points.

Figure 2:
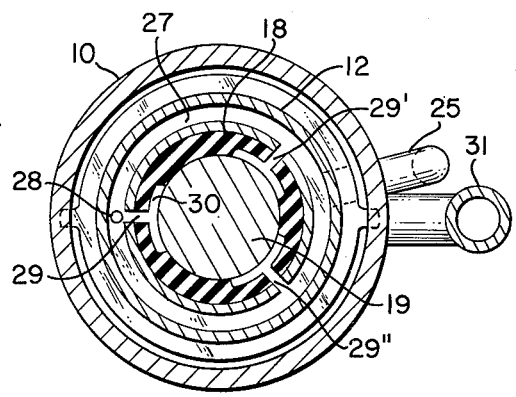
FIG. 2 is a cross section taken in the direction of the arrows 2—2 of FIG. 1.

FIG. 2 illustrates the water passages within the upper bearing block 12 in greater detail. Thus, it will be noted that in addition to the radial jet passage 29 terminating in the pocket 30 at the contact surfaces of the upper tapered end of shaft 19 and rubber bushing 18, there are provided further radial metering jet passages indicated at 29' and 29'' all communicating with the annular manifold 27, these latter jet passages also terminating in pockets corresponding to the pocket 30. In the embodiment described, there are provided at least three of the jet passages 29 equally circumferentially spaced as illustrated so that water under pressure will be more uniformly distributed about the annular tapered contact portions than would be the case were only one radial inlet metering jet passage provided.

In the operation of the embodiment of FIGS. 1 and 2, it will be understood that water under pressure when forced into the inlet 25 will pass into the lower and upper annular manifolds 26 and 27 in the lower and upper bearing blocks respectively to saturate the lower and upper rubber bushings 17 and 18. The water will soak into the pores of the rubber and essentially "float" the shaft in view of the water pressure against the tapered end portions. The substantially zero clearance is maintained because of the presence of the compression spring 24 which, as described, exerts a force tending to axially move the lower and upper bearings apart; that is, in directions towards the increasing diameter of the tapers.

By the term "substantially zero clearance" it is meant sufficiently close surface-to-surface contact between the rubber and metal to inhibit any substantial sidewise or axial movement of the shaft itself yet assure that there will exist an extremely thin film of water in the surface pores of the rubber which actually constitutes the bearing for the tapered metal portions of the shaft. This water is continuously supplied under pressure but as the rotational speed of the shaft increases the water will be drawn from the supply so that the pressure could be reduced. For example, if .009 inch diameter metering jet passages are provided, a water pressure of 100 p.s.i. would be sufficient to start rotation of the shaft.

Any dimensional changes in the rubber bushings as a consequence of absorption of the bushings by water in the rubber will readily be accommodated by small axial shifts of the bearing blocks and bushings relative to the tapered ends of the shaft, the biasing compression spring 24 always assuring that the desired "substantially zero clearance" is maintained.

Figure 3:
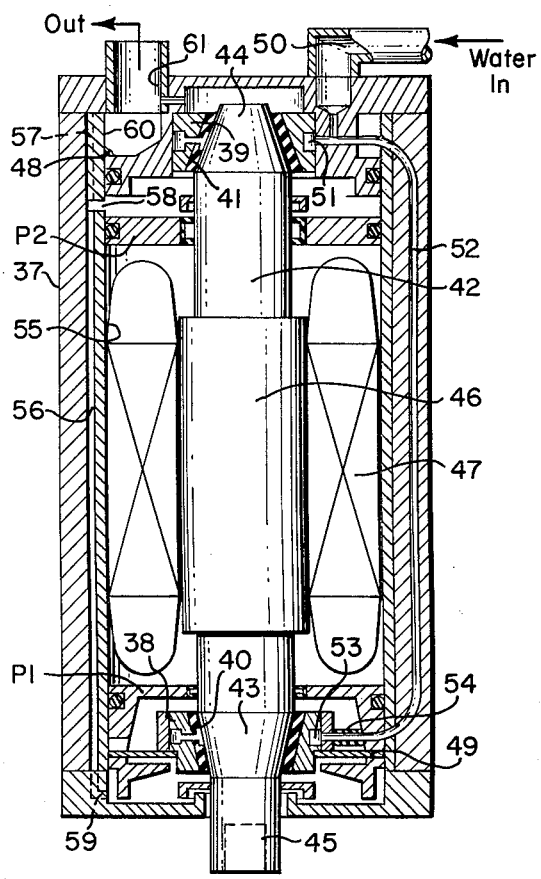
FIG. 3 is a cut-away veiw partly in cross section of a second embodiment of the invention.

FIG. 3 shows another embodiment of the invention wherein an electric drive motor for the drill spindle shaft is incorporated within the cylindrical barrel supporting the bearing blocks. Thus, in FIG. 3 there is shown an outer cylindrical barrel 37 incorporating lower and upper bearing blocks 38 and 39 within which are secured tapered conically shaped rubber bushings 40 and 41 respectively.

The drill spindle shaft is shown at 42 and includes lower and upper tapered end portions 43 and 44 matching the tapers of the lower and upper rubber bushings 40 and 41. In the embodiment of FIG. 3, these tapers are shown opposite to each other as in the case of FIG. 1 but in different directions. Thus, the lower end taper 43 for the shaft 42 increases in diameter in an upward direction and the opposite upper end taper 44 decreases in diameter in an upward direction. The extreme lower end of the shaft 42 includes a collet 45 for holding a drill similar to the collet 22 described in FIG. 1.

In the central portion of the outer cylindrical barrel 37, there is enclosed an electric motor for the shaft 42 including a rotor 46 on the central portion of the shaft surrounded by stator windings 47. Lower and upper sealing partitions P1 and P2 isolate the motor portion from the remaining lower and upper interior portions of the barrel 37.

As in the case of the embodiment of FIG. 1, one of the bearing blocks is secured in a stationary position while the other is arranged to move slightly in an axial direction. However, in the case of FIG. 3, the upper bearing block 39 is locked relative to the outer cylindrical barrel 37 as indicated at 48 while the lower bearing block 38 constitutes that bearing block which is axially movable. In this respect, it will be noted that the lower bearing block 38 is centrally mounted to an annular spring disk-shaped washer 49 having its periphery secured relative to the outer cylindrical barrel 37. The arrangement is such that the spring washer 49 will exert an upwardly biasing force on the lower bearing block 38 and thus through the medium of the shaft 42 exert a biasing force against the upper bearing so that again substantially zero clearance obtains.

Water for the lower and upper rubber bushings 40 and 41 in FIG. 3 is supplied in the upper right through an inlet 50 wherein the same passes into an annular manifold 51 formed in the upper bearing block 39 and thence through an internal passage 52 formed in the wall of the outer cylindrical barrel 37 to pass down the barrel and connect to the annular manifold 53 in the lower bearing block 38. This latter connection from the passage 52 is effected by a flexible tube 54 which will accommodate slight axial movements of the lower bearing block on the spring washer 49.

The annular manifolds in the lower and upper bearing blocks communicate with radially inwardly extending metering jets terminating in pockets at the interengaging surfaces of the rubber bushings and tapered end portions of the shaft in precisely the same manner as that described in conjunction with FIGS. 1 and 2 and thus details thereof need not be repeated.

In order to remove water escaping from the bearings in the lower and upper end portions below and above the partitions P1 and P2 respectively, there are provided additional water passages. These additional water passages are formed by providing an inner cylinder or sleeve 55 coaxially nested within the outer barrel 37, this sleeve being provided with external grooves parallel to its axis to define water passages with the inside wall of the outer barrel 37. One of these passages is shown at 56 and extends from the bottom of the inner cylinder 55 to terminate short of the upper end of the inner cylinder. Other of the grooves defining the passages extend higher than the passage 56 such as indicated at dotted lines 57 to terminate much closer to the upper end of the inner cylinder.

Upper and lower outlet ports 58 and 59 are provided for the shorter water passages typified by the groove 56, the upper port 58 communicating with the area under the upper bearing block 39 and above the upper partition P2. Essentially, water from the upper bearing passes through the shorter water passages such as 56 to the lower interior portion and thence this water passing from the lower port 59 is recirculated with water from the lower bearing up the longer grooves such as that described at 57 to pass out a top outlet port such as 60 to a water removal passage 61.

Figure 4:
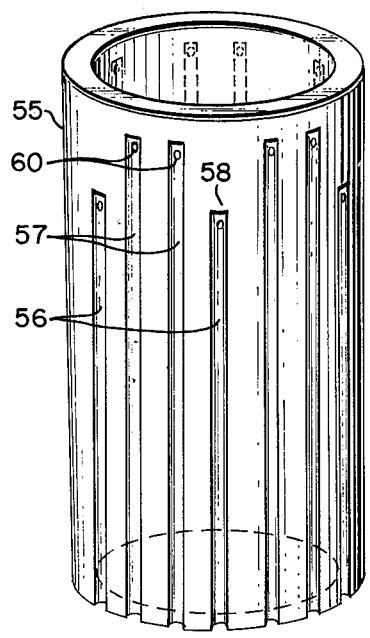
FIG. 4 is a perspective view of an inner cylindrical component of the assembly of FIG. 3; and, FIG. 5 is a plan view of a spring washer used in the assembly of FIG. 3.

All of the foregoing will be better understood by referring to the perspective view of FIG. 4 showing the inner cylinder 55 separated from the remaining structure. As shown, the exterior surface of this cylinder is provided with the grooves, the shorter grooves typified by the passage 56 described in FIG. 3 being designated by the same numeral in FIG. 4, the longer passages being similarly indicated by the same numeral 57. The ports 58 and 60 are also indicated in FIG. 4.

It will be appreciated in FIG. 4 that every third groove counting around in a circumferential direction constitutes a shorter groove and serves to define a passage for downward movement of water from the upper bearing to the bottom interior portion while the remaining longer grooves 57 serve as a return path for the water to pass out the water removal outlet 61 described in FIG. 3. By providing the several passages for circulating the water as described, cooling of the motor is assured which feature is important.

Figure 5:
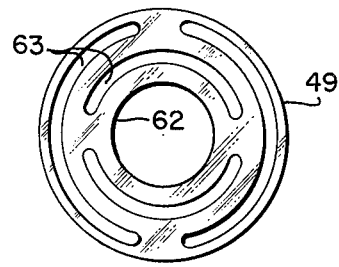

FIG. 5 shows in plan view the spring washer 49 described in FIG. 3 wherein it will be noted that there is a cut-out central portion 62 for supporting the lower bearing block 38 together with arcuate cut-out slots 63 to provide the spring characteristic for the washer.

The operation of the embodiment of FIGS. 3 to 5 is similar to that of FIG. 1. Again, in starting the rotation of the shaft, water under pressure is supplied through the inlet 50 to fill the various pockets at the ends of the inwardly directed metering jet passages within the lower and upper bearing blocks respectively. These pockets have sufficient area so that the shaft journal is moved out of the rubber bearing seat of the rubber bushing until the escaping water around the periphery of the pocket causes enough pressure drop through the metering jet to produce a balance all as is the case with FIG. 1. Further, as in the case of FIG. 1 there are provided three jets and pockets at equal circumferential spacing; that is, 120° intervals, the shaft accordingly becoming free floating on a thin film of water in surface pores of the rubber bushings.

As already described, the excess water from the upper bearing will pass through the upper ports 58 and down through the shorter groove-like passages in the inner cylinder 55 such as 56 to the lower interior portion and thence along with water from the lower bearing up the longer groove passages 57 and out the water outlet 61 thereby cooling the motor. Any swelling of the rubber bushings will be accommodated, as in the case of FIG. 1, by relative axial movements of the bearing blocks as a consequence of the spring mounting of the lower bearing block by the spring washer 49.

From the foregoing description, it will thus be evident that the present invention has provided a greatly improved water-rubber bearing high speed drill spindle assembly wherein the various advantages set forth heretofore can be fully realized. Thus, in each of the embodiments described, the shaft is "floated" on a water bearing supplied by the rubber bushings and the self-compensating adjustment of the bushings by axial movement of the bearing blocks assures substantially zero clearance notwithstanding various dimensional changes in the rubber bushings themselves.

Problems associated with prior art types of rubber-water bearings have thus been overcome by the present invention.

What is claimed is:

1. A water rubber bearing high speed drill spindle comprising, in combination:
   a. an outer cylindrical barrel;
   b. lower and upper bearing blocks disposed in the lower and upper ends of said barrel, respectively, defining annular tapered surfaces;
   c. lower and upper rubber bearing bushings secured to said surfaces and of conical shape to match the tapered surfaces, the taper of the surfaces and rubber bushings of the lower and upper bearing blocks being in opposite directions;
   d. a shaft passing through said rubber bushings and having lower and upper end portions tapered in opposite directions to match the taper of the bushings, one of said bearing blocks being axially movable within said barrel, and the other bearing block being locked to said barrel;
   e. biasing means in said barrel urging the axially movable bearing block in the direction of increasing taper so that both of said rubber bushings are biased into engagement with the respective tapered surfaces of said shaft to leave substantially zero clearance; and,
   f. water passage means in said bearing blocks and rubber bushings for introducing water between the engaging conical surfaces of the rubber bushings and tapered end portions of the shaft whereby said shaft is "floated" on a water bearing supplied by the water in the pores of the rubber bushings, said biasing means permitting swelling of the rubber bushings when saturated with water and yet maintaining the desired substantially zero clearance of the bearing surfaces.

2. The subject matter of claim 1, in which said water passage means includes a water inlet passage, each of said bearing blocks including an annular manifold in communication with said water inlet passage and including at least three metering jet passages circumferentially equally distributed about the manifold and passing into the associated rubber bushing to terminate in pockets at the surface to surface contact areas of the bushing with the associated tapered shaft portion.

3. The subject matter of claim 2, in which the lower end taper of said shaft is defined by an increasing diameter in a downward direction and the upper end taper by an increasing diameter in an upper direction, said one of said bearing blocks that is axially movable being keyed to the inside of said barrel against rotational movement and said biasing means comprising a coiled compression spring surrounding said shaft and having its opposite ends exerting downward and upper forces respectively on said lower and upper bearing blocks tending to urge them apart.

4. The subject matter of claim 3, in which said water passage means includes a flexible tube interconnecting the annular manifolds in each of the bearing blocks, said tube being sufficiently slack to accommodate any change in the relative axial distance between the bearing blocks.

5. The subject matter of claim 4, in which said water passage means further includes a vacuum outlet passage means communicating with the lower and upper interior portions of said barrel adjacent to the lower and upper bearing blocks for removing water.

6. The subject matter of claim 2, in which the lower end taper of said shaft is defined by an increasing diameter in an upward direction and the upper end taper by a decrease in diameter in an upward direction, said biasing means comprising a spring washer disk centrally supporting said one of said bearing blocks that is axially movable and having its periphery secured relative to the inside wall of said barrel, the central portion of said spring washer disk urging said bearing block supported therein in said direction of increasing taper thereby tending to urge said lower and upper bearing blocks together.

7. The subject matter of claim 6, in which the central portion of said shaft carries a rotor, said barrel incorporating stator windings surrounding said rotor and axially positioned between said bearing blocks to thereby provide a self-contained electric motor for rotating said shaft.

8. The subject matter of claim 7, in which said water passage means includes an internal passage in the wall of said barrel connected respectively to said annular manifolds in each of said bearing blocks, the connection to the manifold in the said one of said bearing blocks that is axially movable constituting a flexible tube to accommodate relative movement thereof.

9. The subject matter of claim 8, in which said water passage means further includes an inner cylinder coaxially nested within said barrel and having external grooves parallel to its axis to define water passages within the inside wall of said barrel, said inner cylinder including lower and upper water ports adjacent to the lower and upper bearing blocks for removing water, the ports being located to pass water from the upper bearing block down some of the grooves and thence upwardly with water from the lower bearing block through the remaining of said grooves to thence exit from said barrel whereby the rotor and stator are cooled.

* * * * *